United States Patent [19]

Canty et al.

[11] 4,090,198
[45] May 16, 1978

[54] PASSIVE REFLECTANCE MODULATOR

[75] Inventors: Eugene T. Canty; Russell P. Tow, both of Santa Barbara, Calif.; Frank J. Spayth, Milwaukee, Wis.; Richard A. Morrow, Chapel Hill, N.C.; Charlie B. Smith, Santa Ana, Calif.

[73] Assignee: General Motors Corporation, Detroit, Mich.

[21] Appl. No.: 394,648

[22] Filed: Aug. 31, 1964

[51] Int. Cl.² ............................................ H01Q 15/02
[52] U.S. Cl. ............................ 343/18 D; 343/100 ET; 343/911 L
[58] Field of Search .................. 343/18 D, 18 C, 754, 343/755, 100 ET, 911 L

[56] References Cited
U.S. PATENT DOCUMENTS
2,580,921  1/1952  Iams ................................... 343/18 D
FOREIGN PATENT DOCUMENTS
1,107,300  5/1961  Germany ........................... 343/18 D Primary Examiner—Malcolm F. Hubler
Attorney, Agent, or Firm—Albert F. Duke

EXEMPLARY CLAIM

1. A reflectance modulator exhibiting an omni-azimuttal reflectance pattern comprising a microwave lens for focusing electromagnetic energy, a plurality of reflector means positioned on a focal surface of said lens and including a gaseous plasma, means for sequentially controlling the ionization level of said plasma to modulate the reflectance of said energy.

7 Claims, 5 Drawing Figures

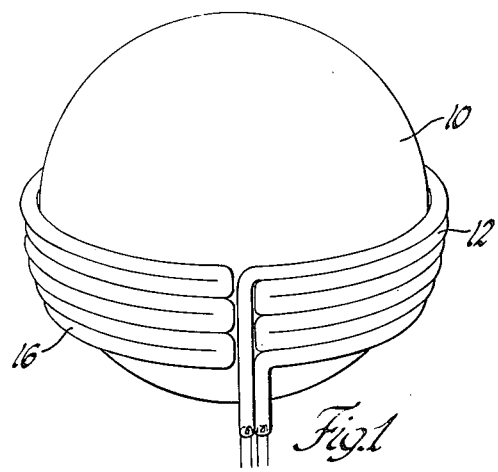
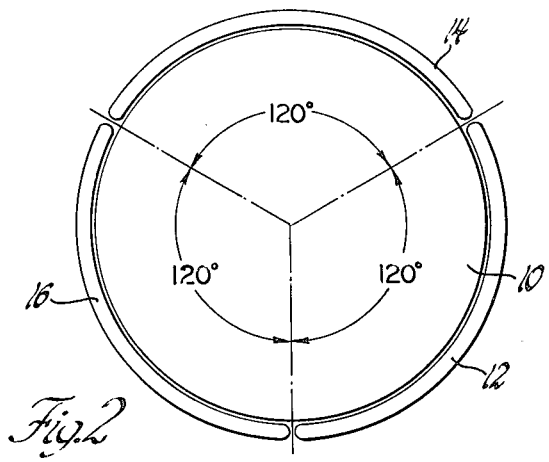
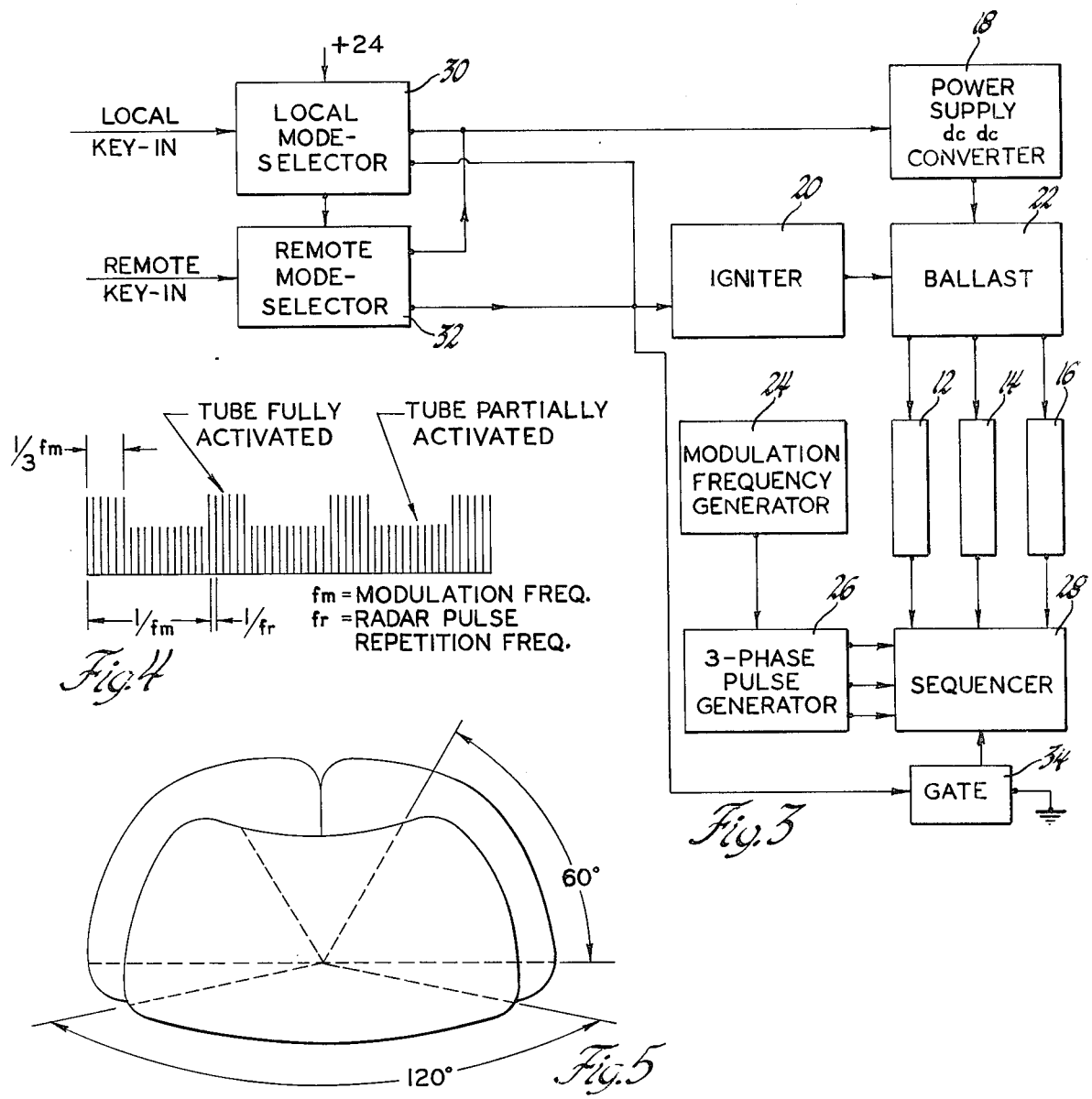

PASSIVE REFLECTANCE MODULATOR

This invention relates to electromagnetically passive reflectors of energy whose reflectivity is caused to behave in a manner that distinctively modulates the reflected energy and more particularly to a reflectance modulation device which imposes an amplitude audio modulation on reflected radio waves by the inner action of electromagnetic energy with a controlled plasma.

It is well known in the radar art that a Luneberg lens sphere having a reflecting material disposed on a portion of the surface of the sphere will act to focus all the electromagnetic waves incident upon one hemisphere to a focal point which is at the pole of the other hemisphere. The reflecting material positioned at the focal point acts to reflect all the radar energy back through the lens to the radar source. Because the reflecting material covers substantially more area than that of a point, radar energy can be impinging on this sphere from many directions without any loss of return signal to the radar source.

It is an object of the present invention to provide an improved microwave reflector wherein substantially omni-azimuthal coverage is obtained.

It is another object of the present invention to provide a passive reflector in which modulated reflectivity is achieved over a large solid angle.

It is a further object of the present invention to provide a passive reflectance modulator which is substantially insensitive to aperture blocking.

In accordance with the present invention, a microwave reflectance modulator is provided which includes a Luneberg lens surrounded by a plurality of plasma sections which are adapted to be sequentially ionized. Since the plasma sections are ionized in sequence, a particular section is ionized and serves as a reflector while the remaining sections are de-ionized and are transparent to incident radiation and therefore do not cause aperture blocking. In addition, the plasma sections may be ionized and de-ionized rapidly so as to provide an illumination of the reflectivity of the plasma section which is versatile and readily controllable whereas such modulation is not achievable with the prior art Luneberg lens type reflectors.

A more complete understanding of the present invention may be had from the following detailed description which should be read in conjunction with the drawings in which:

FIG. 1 is a side elevational view of a preferred embodiment of the present invention;

FIG. 2 is a plan view of the device shown in FIG. 1;

FIG. 3 is a block diagram of the circuitry that operates and controls the plasma sections of the present invention;

FIG. 4 illustrates a video detected return from the device of the present invention under ideal circumstances;

FIG. 5 illustrates the ideal spacial coverage of the reflectivity pattern.

Referring now to the drawings and initially to FIGS. 1 and 2, the microwave reflectance modulator comprises a spherical Luneberg lens 10. The Luneberg lens 10 is well known in the art and has the property of focusing parallel rays incident upon a side of the spherical surface to a point on the opposite surface where a diameter of the sphere parallel to the incident rays intersects the opposite surface.

Omni-azimuthal coverage is obtained by encompassing the lower hemisphere of the lens 10 with plasma containers 12, 14 and 16. The containers 12, 14 and 16 are formed to the spherical contour of the lens 10 and spaced so that the contained plasma is placed at the focal surface of the lens. Each plasma container covers one/third of the surface between the equator of the lens 10 and a line that would be 60° south latitude on the lens. Each of the containers or tubes is filled with argon gas and mercury.

Referring now to FIG. 3, there is shown a block diagram of the circuitry that operates and controls the plasma sections 12, 14 and 16. All circuitry with the exception of the plasma tubes is powered directly from a 24 volt DC primary power source. The primary power input feeds a power supply 18 and an igniter 20. The power supply 18 is a conventional transistorized DC to DC converter which converts the 24 volt DC to the high voltage required by the plasma tubes. When the plasma tubes are operated in the arc conduction state, the tubes will act as a negative resistance drawing increasing current with a decrease in voltage.

In order to maintain current stability in the arc conduction mode, ballast resistors generally designated 22 are placed in series with each plasma tube 12, 14 and 16. For proper ballasting, more than one/half the voltage developed in the power supply is dropped across the ballast resistor. The ballast resistance for each plasma tube is provided by two resistors, one fixed and the other variable, permitting the current in each tube to be adjusted and balanced. The converter 18 provides a DC voltage and current that when applied through the proper ballast resistor excites the plasma tubes 12, 14 and 16 into a region of conduction that reflects microwave energy.

The igniter 20 makes the plasma tubes 12, 14 and 16 conductive by providing a high-voltage pulse to ionize the argon and mercury vapor contained in the plasma tubes. Additional igniter pulses are not required after ionization has occurred because the current drawn by the plasma tubes in both the low conduction and high conduction state will normally sustain the ionized condition.

A modulation frequency generator 24 provides the base for a three-phase generator 26 which can be varied to produce 100 cps to 800 cps from the three-phase generator 26. The output of the three-phase generator 26 drives a sequencing circuit generally designated 28. The trigger pulses from the three-phase generator are used to close the circuits of plasma tubes 12, 14 and 16 in sequence. This allows the voltage from the igniter 20 to fire the tube. The voltage from the power supply will then sustain the tube for the duty cycle. As the individual plasma tubes 12, 14 and 16 are switched into heavy conduction, the tube that was previously conducting is simultaneously caused to return to a low conduction state.

Mode selector switches generally designated 30 and 32 are provided whereby both local and remote control is obtained. Each selector provides on-off or key modes of operation. In the keying mode of operation, a standard telegraph key may be utilized to key the modulation tone for coding. A GATE circuit 34 is provided which is controlled by the key at either the local or remote location. In the key mode of operation, the plasma sequencing network is made insensitive to the incoming trigger pulse during the off key cycle.

The radar echo is modulated by activating each plasma tube 12, 14 and 16 into full conduction in a three-phase sequence. This produces the effect of a reflecting shell rotating around the lower hemisphere of the lens 10. When this revolving reflecting shell occupies the area corresponding to the focused electromagnetic waves, the radar echo is enhanced. Since each reflecting plasma is active for one/third of the sequencing period, then the echo of the illuminating radar is enhanced for one/third of the sequencing period. FIG. 4 illustrates a video detected return under ideal circumstances.

While there is some loss in the two unactivated plasma sections, it is much less than if all these plasma sections were activated and thus reflective on the outer surface. It is, therefore, apparent that the theoretical maximum radar cross section of a Luneberg lens is reduced slightly by some aperture blocking. However, as the angle of plane wave arrival increases above the horizon, aperture blocking decreases since less of the covered surface of the lens is normal to the plane waves. The vertical coverage, zero degrees to +60° from the horizontal, is obtained by fabricating the three plasma sections 12, 14 and 16 so that they cover an area from the equator to −60° from the equator. The resulting ideal reflectance pattern is indicated in FIG. 5.

While the invention has been described with regard to a specific embodiment thereof, this should not be construed in a limiting sense. Modification will now occur to those skilled in the art. For a definition of the invention, reference is made to the appended claims.

We claim:

1. A reflectance modulator exhibiting an omni-azimuthal reflectance pattern comprising a microwave lens for focusing electromagnetic energy, a plurality of reflector means positioned on a focal surface of said lens and including a gaseous plasma, means for sequentially controlling the ionization level of said plasma to modulate the reflectance of said energy.

2. A reflectance modulator as claimed in claim 1 wherein said gaseous plasma is argon gas and mercury.

3. A reflectance modulator as claimed in claim 2 wherein said microwave lens is a Luneberg lens.

4. A reflectance modulating device exhibiting an omni-azimuthal reflectance pattern comprising a spherical Luneberg lens, a plurality of plasma containers encompassing the lower hemisphere of said lens, said sections being formed to the spherical contour of said lens and spaced so that the contained plasma is placed at a focal surface of the lens, means for sequentially ionizing the plasma to provide amplitude modulation of reflected electromagnetic waves impinging upon said device.

5. A reflectance modulating device comprising a spherical Luneberg lens, a plurality of enclosures housing a gaseous plasma, each of said enclosures being formed to the spherical contour of said lens and positioned on said lens in the path of electromagnetic energy impinging upon said lens, means providing a modulated electrical signal, means for selectively applying said signal to the plasma in said enclosures for controlling the ionization thereof.

6. A reflectance modulating device comprising a spherical microwave lens for focusing electromagnetic energy, first, second and third enclosures having a gaseous plasma, each of said enclosures being formed to the spherical contour of said lens and positioned on said lens to cover substantially one/third of the surface thereof between the equator and a predetermined latitude on one hemisphere of said lens, means for sequentially ionizing the plasma in each of said enclosures to provide amplitude modulation of reflected electromagnetic waves impinging upon said device.

7. A reflectance modulating device comprising a spherical Luneberg lens, first, second and third enclosures having a gaseous plasma, each of said enclosures being formed to the spherical contour of said lens and positioned on said lens to cover one/third of the surface thereof between the equator and 60° south latitude on said lens, means for sequentially ionizing the plasma in each of said enclosures to provide amplitude modulation of reflected electromagnetic waves impinging upon said device.

* * * * *